United States Patent
Whurr et al.

(10) Patent No.: US 11,008,976 B2
(45) Date of Patent: May 18, 2021

(54) AFTERBURNER SYSTEM FOR TURBOFAN ENGINE

(71) Applicant: ROLLS-ROYCE PLC, London (GB)

(72) Inventors: John R Whurr, Derby (GB); Peter K Beardsley, Derby (GB); Philip A Curnock, Derby (GB); Faidon Mitzalis, Derby (GB)

(73) Assignee: ROLLS-ROYCE plc, London (GB)

(*) Notice: Subject to any disclaimer, the term of this patent is extended or adjusted under 35 U.S.C. 154(b) by 95 days.

(21) Appl. No.: 16/575,555

(22) Filed: Sep. 19, 2019

(65) Prior Publication Data
US 2020/0116359 A1 Apr. 16, 2020

(30) Foreign Application Priority Data

Oct. 12, 2018 (GR) .............................. 20180100467
Dec. 4, 2018 (GB) ..................................... 1819748

(51) Int. Cl.
*F02K 3/10* (2006.01)
*F23R 3/26* (2006.01)
(Continued)

(52) U.S. Cl.
CPC .................. *F02K 3/10* (2013.01); *F02C 3/04* (2013.01); *F02K 3/06* (2013.01); *F23R 3/26* (2013.01); *F23R 3/34* (2013.01); *F05D 2220/80* (2013.01)

(58) Field of Classification Search
CPC ... F02K 3/02; F02K 3/025; F02K 3/04; F02K 3/06; F02K 3/075; F02K 3/08; F02K 3/10;
(Continued)

(56) References Cited

U.S. PATENT DOCUMENTS 2,913,874 A 11/1959 Travers
2,929,203 A 3/1960 Henning, Jr. et al.
(Continued)

FOREIGN PATENT DOCUMENTS

GB 1180524 A 2/1970
GB 1273017 A 5/1972
GB 1503425 A 3/1978

OTHER PUBLICATIONS

May 30, 2019 Search Report issued in British Patent Application No. 1819748.3.
(Continued)

*Primary Examiner* — William H Rodriguez
(74) *Attorney, Agent, or Firm* — Oliff PLC (57) ABSTRACT

A turbofan engine has: an engine core producing a core exhaust flow; an upstream fan; a bypass duct carrying a bypass air flow produced by the fan; an exhaust assembly. The turbofan engine afterburner system has: a core plug; second core flow duct, and entrance(s) from the first core flow duct for diversion into the second of a portion of the core exhaust flow, and exit for re-joining the diverted portion of the core exhaust flow to the undiverted portion of the core exhaust flow; door(s) open during normal operation of the engine but closable, during a reheat operation, to block the entrances to the second core flow duct; and fuel injector(s) and igniter(s) operable, during the reheat operation, to inject and ignite fuel within the second core flow duct, providing a reheat flow into the core exhaust flow from the exit of the second core flow duct.

15 Claims, 4 Drawing Sheets

(51) Int. Cl.
*F23R 3/34* (2006.01)
*F02C 3/04* (2006.01)
*F02K 3/06* (2006.01)

(58) Field of Classification Search
CPC ... F02K 3/105; F02K 3/11; F02K 1/04; F23R 3/18; F23R 3/20; F23R 3/26; F23R 3/34; F05D 2220/80
See application file for complete search history.

(56) References Cited

U.S. PATENT DOCUMENTS

| | | | |
|---|---|---|---|
| 3,331,204 A | | 7/1967 | Love |
| 4,798,048 A | * | 1/1989 | Clements ................. F02K 1/04 60/39.826 |
| 5,385,015 A | * | 1/1995 | Clements ................. F23R 3/20 60/39.826 |
| 2003/0150214 A1 | | 8/2003 | Lair |
| 2005/0086941 A1 | | 4/2005 | Bunel et al. |
| 2005/0198940 A1 | | 9/2005 | Koshoffer et al. |
| 2010/0050643 A1 | * | 3/2010 | Snyder ................. F02C 7/2365 60/737 |

OTHER PUBLICATIONS

Feb. 13, 2020 Search Report issued in European Patent Application No. 19197014.4.

\* cited by examiner

AFTERBURNER SYSTEM FOR TURBOFAN ENGINE

CROSS-REFERENCE TO RELATED APPLICATIONS

This specification is based upon and claims the benefit of priority from Greek patent application number GR 20180100467 filed on Oct. 12, 2018 and United Kingdom patent application number GB 1819748.3 filed on Dec. 4, 2018, the entire contents of which are incorporated herein by reference.

BACKGROUND

Field of the Disclosure

The present disclosure relates to a turbofan engine, such as a turbofan engine for use on a supersonic aircraft, and an afterburner system for such an engine.

Description of the Related Art

There is a growing interest in the development of supersonic aircrafts for civil use. In particular, gas turbine engine systems that effectively provide thrust in subsonic, transonic and supersonic flight regimes, with reduced noise output during certain operations, are of interest.

A turbofan engine typically comprises, in axial flow series, an air intake, a propulsive fan, one or more compressors, combustion equipment, and one or more turbines. Air entering the intake is accelerated by the fan to produce two air flows: a core flow into the one or more compressors and a bypass flow which passes through a bypass duct and to provide propulsive thrust. The compressed air exhausted from the compressor(s) is directed into the combustion equipment where it is mixed with fuel and the mixture combusted. The resultant hot combustion products then expand through, and thereby drive the turbine(s), before being exhausted as a core exhaust flow to provide further propulsive thrust.

Afterburning, or re-heating, systems introduce additional fuel into the exhaust flow and ignite it for limited periods. This increase in the temperature of the exhaust flow increases the thrust provided by the engine, and can be particularly beneficially employed during the operation of supersonic engines. However, conventional afterburner systems introduce significant performance penalties, particularly during non-afterburning operations, as they impact the entire exhaust flow. There is a desire then to provide an afterburner system which, during non-afterburning operations, reduces these performance penalties.

SUMMARY OF THE DISCLOSURE

Accordingly, in a first aspect, there is a turbofan engine having:
an engine core comprising a compressor, a combustor, a turbine, and a core shaft connecting the turbine to the compressor, and producing a core exhaust flow;
a fan upstream of the engine core;
a bypass duct surrounding the engine core and carrying a bypass air flow produced by the fan;
an exhaust assembly comprising a first exhaust nozzle defining a downstream end of a first core flow duct which receives the core exhaust flow produced by the engine core; and
an afterburner system comprising:
a core plug defining a radially inner surface of the first core flow duct;
a second core flow duct located in the core plug, and having one or more entrances from the first core flow duct for diversion into the second core flow duct of a portion of the core exhaust flow, and further having an exit therefrom for re-joining the diverted portion of the core exhaust flow to the undiverted portion of the core exhaust flow;
one or more respective doors for the entrances to the second core flow duct, the doors being open during normal operation of the engine but being closable, during a reheat operation, to at least partially block the entrances to the second core flow duct; and
one or more fuel injectors and one or more respective igniters operable, during the reheat operation, to respectively inject and ignite fuel within the second core flow duct, thereby providing a reheat flow into the core exhaust flow from the exit of the second core flow duct.

By restricting the generation of the reheat flow to the second core flow duct, pressure losses during normal (i.e. non-afterburning) operation can be reduced, as compared to a conventional afterburner system. In particular, core exhaust flow through the first core flow duct can remain largely unaffected by the reheat equipment (injectors, igniters etc.). However, in addition to the known benefits of an afterburner system, the use of the afterburner system of the first aspect introduces an area change in the hot chute of the turbofan engine (i.e. via the closure of the doors), which can give an additional thrust boost during the engine's cycle. Additionally, reheating is limited to the core flow and therefore the need for high temperature materials in other components (for example the first exhaust nozzle) can be avoided, i.e. because the bypass air flow is not reheated.

The turbofan engine may have any one or, to the extent that they are compatible, any combination of the following optional features.

The turbofan engine may be configured for supersonic flight operation.

The first exhaust nozzle may also define a downstream end of the bypass duct. In this case, the engine may further have an exhaust duct receiving the bypass air flow and the core exhaust flow and exhausting these flows at a second exhaust nozzle. The first exhaust nozzle may then be a mixer nozzle which encourages mixing of the bypass air flow and the core exhaust flow downstream thereof. The mixer nozzle may be a lobed mixer nozzle. The bypass air flow is typically much cooler than the reheated core exhaust flow. As such, the bypass air flow may protect other components, for example the first exhaust nozzle and the second exhaust nozzle, from thermal damage from the reheated flow.

The or each door may be a covering or flap over the respective entrance of the second core flow duct located upstream of the one or more fuel injectors and igniters. The or each fuel injector and its respective igniter may be a single unit or, alternatively, may be separate units. The or each door may be actively maintained in an open configuration during normal operation, i.e. via one or more mechanisms or, may be configured so as to be held open by exhaust gas pressure.

Conveniently, wherein the afterburner system may further comprise a fuel-based hydraulic system for actuating the opening and closing of the doors.

The fuel injectors and igniters may be configured to be concealed from the second core flow duct when the doors are open and revealed to the second core flow duct when the doors are closed. As such, any deleterious flow-disturbing effects of the fuel injectors and igniters during normal (non-reheating) operation can be reduced.

The second core flow duct may be an annular duct coaxial with the axis of the engine.

The afterburner system may comprise plural doors circumferentially spaced around the core plug.

The afterburner system may include flow straighteners located between respective pairs of adjacent doors.

The doors, when closed, may merely reduce the amount of flow diversion from the second core flow duct to form a purge flow in the second core flow duct. Alternatively, the doors may be configured to completely seal the entrances of the second core flow duct when closed to prevent the flow diversion.

The afterburner system may be configured to form, downstream of the second core flow duct when the doors are closed, a recirculating airflow. The recirculating airflow may provide a region with a relatively low air speed (in a direction axially away from the core plug) whereupon a more stable flame can be formed during reheat operation. Additionally or alternatively, the afterburner system may further comprise a physical flameholder to stabilise the flame. The flameholder may be configured to be concealed from the second core flow duct when the doors are open and revealed to the second core flow duct when the doors are closed.

In a second aspect, there is provided an afterburner system, installable downstream of an engine core of a turbofan engine, the system including:
  a core plug defining a radially inner surface of a first core flow duct which receives a core exhaust flow produced by the engine core;
  a second core flow duct located in the core plug, and having one or more entrances from the first core flow duct for diversion into the second core flow duct of a portion of the core exhaust flow, and further having an exit therefrom for re-joining the diverted portion of the core exhaust flow to the undiverted portion of the core exhaust flow;
  one or more respective doors for the entrances to the second core flow duct, the doors being open during normal operation of the engine but being closable, during a reheat operation, to at least partially block the entrances to the second core flow duct; and
  one or more fuel injectors and one or more respective igniters operable, during the reheat operation, to respectively inject and ignite fuel within the second core flow duct, thereby providing a reheat flow into the core exhaust flow from the exit of the second core flow duct.

The afterburner system of the second aspect may be the afterburner system as referred to in the first aspect, and may have any one or, to the extent that they are compatible, any combination of the optional features related thereto.

In third aspect, there is provided a supersonic aircraft having one or more turbofan engines according to the first aspect.

In a fourth aspect, there is provided a method of providing a temporary thrust boost in the supersonic aircraft of the third aspect including the step of:
  closing the doors so as to at least partially block the entrances to the second core flow duct.

Advantageously, merely closing the doors can provide a temporary thrust boost by shifting the engine operation point.

However, the method may have any one or, to the extent that they are compatible, any combination of the following optional features.

In particular, the method may further include the step of injecting and igniting fuel within the second core flow duct, thereby providing a reheated airflow and a temporary thrust boost. The closing, and injecting and igniting steps may be performed in either order. Generally, the step of closing the doors is performed before the step of injecting and igniting the fuel. Typically the temporary thrust boost provided by the reheated airflow is significantly greater than that provided by merely closing the doors.

The method may further include the step, performed after the closing step, of: re-opening the doors. When the method includes the step of injecting and igniting fuel within the second core flow duct, then the method may further include the step, performed after the injecting and igniting of: ending the injection and ignition of fuel within the second core flow duct. The ending the injection and ignition, and re-opening steps may be performed in either order. Generally, the step of ending the injection and ignition is performed before the step of re-opening the doors. These steps may be performed so as to place the engine to a more fuel efficient configuration, e.g. when afterburning is not required.

The temporary thrust boost may be performed as part of a trans-sonic thrust operation. Alternatively, or additionally, the temporary thrust boost may be performed during either or both of a take-off operation and a climbing operation.

BRIEF DESCRIPTION OF THE DRAWINGS

Embodiments of the disclosure will now be described by way of example with reference to the accompanying drawings in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
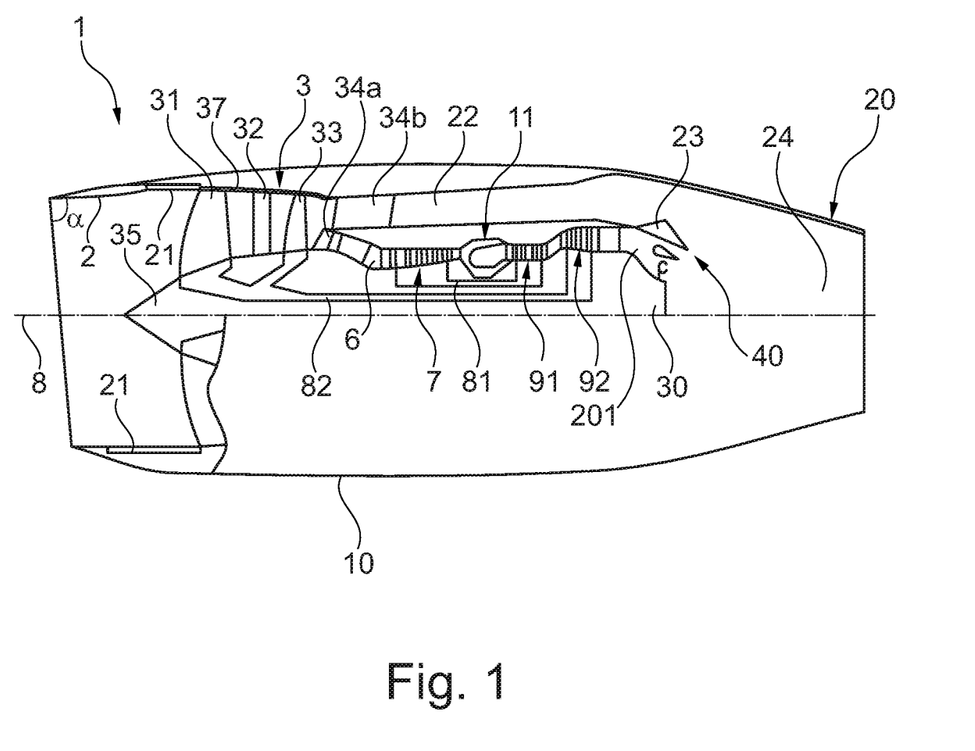
FIG. 1 is a sectional side view of a turbofan engine.

FIG. 1 shows a longitudinal cross-section through a turbofan engine 1 for a civil supersonic aircraft. The turbofan engine 1 comprises an engine intake 2, a multi-stage fan 3, a primary flow channel 6 that leads through an engine core, a secondary flow channel 22 that leads past the engine core, a lobed mixer nozzle 23, an exhaust duct 24, and an exhaust nozzle 20 into which a thrust reverser (not shown) can be integrated.

The turbofan engine 1 has a machine axis or engine centre line 8. The machine axis 8 defines an axial direction of the turbofan engine. A radial direction of the turbofan engine extends perpendicularly to the axial direction.

The engine core comprises in a per se known manner a compressor 7, a combustion chamber 11 and a turbine 91, 92. In the shown exemplary embodiment, the compressor comprises a high-pressure compressor 7. A low-pressure compressor is formed by the areas of the multi-stage fan rotor 3 that are located close to the hub. The turbine that is arranged behind the combustion chamber 11 comprises a high-pressure turbine 91 and a low-pressure turbine 92. The high-pressure turbine 91 drives a high-pressure shaft 81 that connects the high-pressure turbine 91 to the high-pressure compressor 7. The low-pressure turbine 92 drives a low-pressure shaft 82 that connects the low-pressure turbine 92 to the multi-stage fan 3.

The turbofan engine 1 is arranged inside an engine nacelle 10. It is connected to the aircraft fuselage, for example via a pylon.

The engine intake 2 forms a supersonic air inlet and is correspondingly provided and suitable for slowing down the inflowing air to velocities of below Ma 1.0. In FIG. 1, but not necessarily, the engine intake is bevelled, forming an angle α, wherein the upper edge projects with respect to the lower edge. This serves for a better distribution of compression shocks as they occur in supersonic flight. However, in principle the engine intake can be formed in a straight manner, i.e. with an angle α of 90°, or a different angle than the one shown.

The engine intake 2 can have an interior cladding of a sound-absorbing material 21. This serves for reducing engine noise.

The fan 3 can be formed as a multi-stage fan, in the shown exemplary embodiment as a double-stage fan. Accordingly, the multi-stage fan 3 comprises a fan rotor 31 and a fan stator 32 that form a first, frontal fan stage, as well as a fan rotor 33 and a fan stator 34a, 34b that form a second, rear fan stage. Upstream, the fan 3 is provided with a nose cone 35. The fan rotors 31, 33 respectively comprise a plurality of rotor blades. The fan stator 32 of the frontal fan stage comprises a plurality of stator blades that are mounted in a fan housing 37. The fan stator of the rear fan stage is split and is formed by a guide baffle 34a that is formed at the entry of the primary flow channel 6, and formed by a guide baffle 34b that is formed at the entry of the secondary flow channel 5. The fan rotors 31, 33 can be configured in BLISK design and can be fixedly attached to each other.

Behind the fan rotor 33, the flow channel through the fan 3 is divided into the primary flow channel 6 and the secondary flow channel 22. The secondary flow channel 22 is also referred to as the bypass flow channel or the bypass duct.

Behind the engine core, the core exhaust flow 201 from the primary flow channel 6 and the bypass air flow from the bypass duct 22 are mixed by the mixer nozzle 23. Further, a core plug 30 is inserted behind the low-pressure turbine 92 to realize the desired cross sections of the core exhaust flow. The exhaust nozzle 20 can be a variable area exhaust nozzle. The core plug 30 includes an afterburner system 40 which is described in more detail below. The afterburner can be used as part of a trans-sonic thrust operation of the engine. Alternatively, or additionally, it can be used during a take-off operation and/or a climbing operation.

Figure 2:
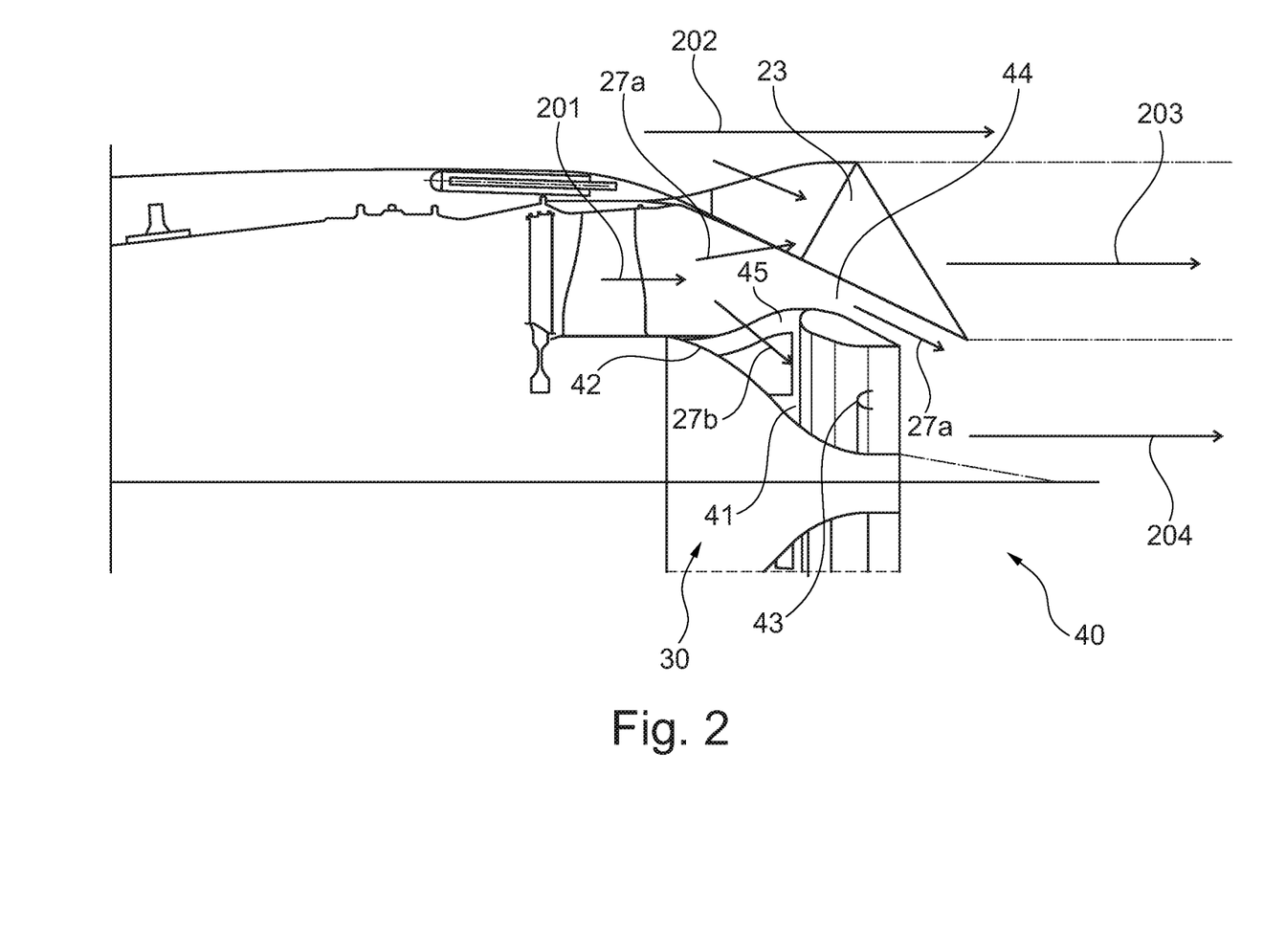
FIG. 2 is a sectional side view of an afterburner system in a non-reheating configuration.

FIG. 2 shows a sectional side of the afterburner system 40 in a non-reheating (normal engine operation) configuration. The core exhaust flow 201 from the low-pressure turbine 92 enters an annular first core flow duct 44 which is bounded on its radially outer side by the mixer nozzle 23 and on its radially inner side by the outer surface of the core plug 30. An undiverted portion 27a of the core exhaust flow 201 travels through the first flow duct. As it does so, radially outer parts of the undiverted portion 27a mix with radially inner parts of the bypass air flow 202 to form a mixed flow 203. By contrast, radially inner parts of the undiverted portion 27a continue through the first core flow duct 44 to arrive at the downstream end of the outer surface of the core plug 30. In parallel, another portion 27b of the core exhaust flow 201 is diverted from the first flow duct 44 through a circumferential row of entrances 45 formed in the outer surface of the core plug 30 into an annular second core exhaust duct 41, located within the core plug 30. These entrances 45 have respective doors 42 which are shown open in FIG. 2. Within the second core exhaust duct 41 are one or more fuel injector and igniter units 43, which in normal (non-reheating) engine operation are not used to inject and ignite fuel. Typically plural such units are circumferentially arranged around the duct. The number and/or position of the doors 42 can be selected in order to reduce noise generation by the afterburner system.

The diverted portion 27b of the core exhaust flow re-joins the radially inner parts of the undiverted portion 27a downstream of the fuel injector and igniter units 43 as a reformed core exhaust flow 204. This then exits the mixer nozzle 23 for onward flow through the exhaust duct 24 to the exhaust nozzle 20 along with the mixed flow 203 and the rest of the bypass air flow 202. Therefore, in non-reheating operation, the flow of core exhaust through the afterburner system 40 incurs few pressure losses.

The doors 42 may be held open by the exhaust gas pressure only, or may be actively held in an open configuration via actuation means, whether that be mechanical, electrical, or hydraulic (e.g. fuel-based hydraulic).

Figure 3:
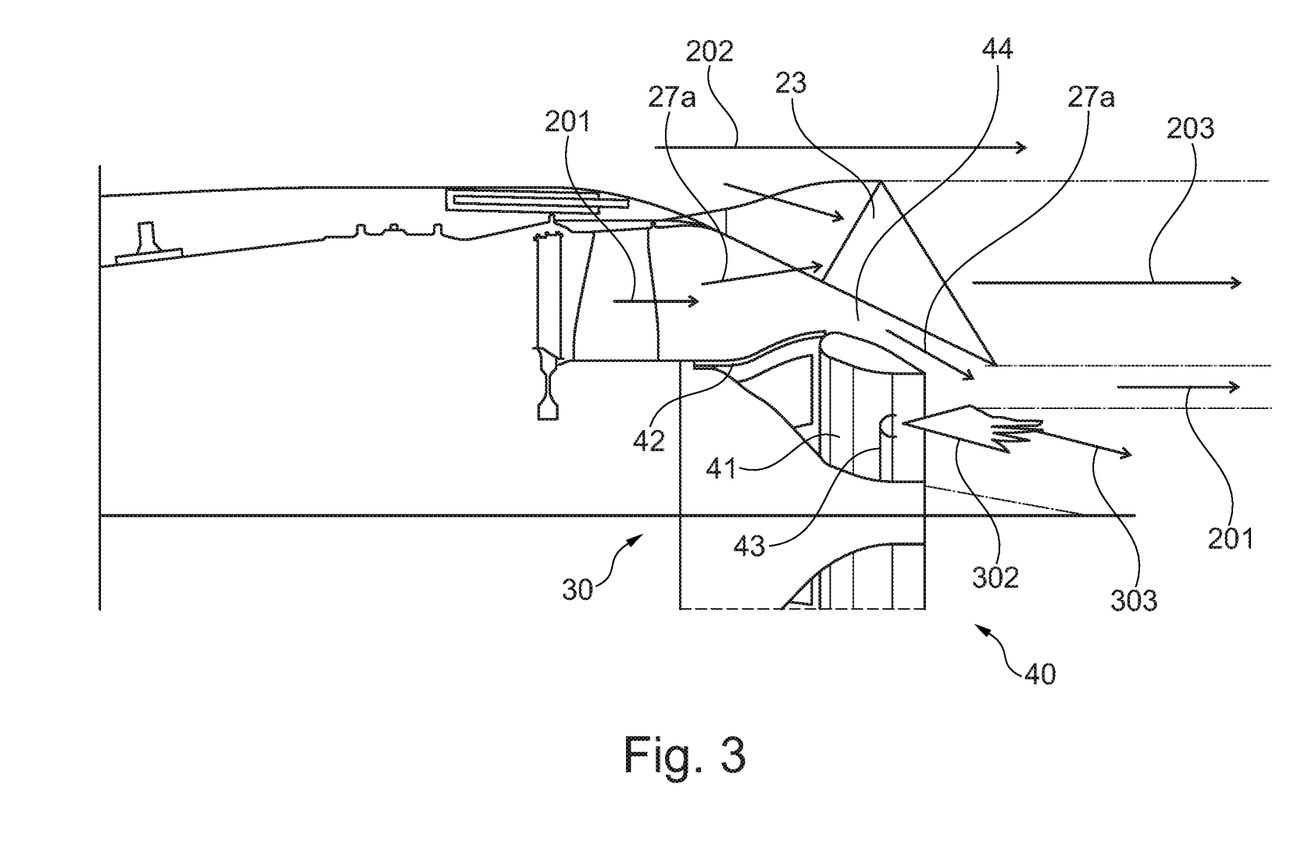
FIG. 3 is a sectional side view of the afterburner system in a reheating configured.

FIG. 3 is then a sectional view of the afterburner system 40 in a reheating configuration. In contrast to the configuration shown in FIG. 2, the doors 42 are now closed to block the entrances to the to the second core flow duct 41. As a result, the core exhaust flow 201 passes undiverted around the outside of the core plug 30 within the first core flow duct 44. The second core exhaust duct 41 provides an annular cavity which encourages a recirculating flow to form downstream of the core plug 30. This in turn creates a region of low speed air (in the axial direction 8) where a stable flame can form.

Within the second core exhaust duct 41, the fuel injectors of the units 43 inject fuel, which is ignited by the igniters. The result is a flame 302 and a reheat flow 303 which provides further thrust to the engine. Of note is that the core exhaust flow 201 exits the afterburner system 40 with a narrower cross-sectional area than the re-formed core exhaust flow 204 in the non-reheating configuration. This narrower cross-sectional area can also impart additional thrust to the engine by shifting the engine operation point. Moreover the velocity of the core exhaust flow 201 increases due to the decrease in cross-sectional area.

Instead of closing the doors 42 to completely block the entrances to the second core exhaust duct 41, an option is to close them in the reheating configuration such that the entrances are only partially blocked. In particular, a small amount of core exhaust flow 201 may be allowed to enter the second core exhaust duct 41 to act as a purge flow therethrough.

As will be appreciated, the reheat flow in this system is limited to the core exhaust flow region of the engine. This leaves the bypass air flow largely unaffected by the increased temperatures of the core exhaust flow during reheating. The colder outer stream can therefore act as protection for the engine aft nacelle (including, for example a thrust reverser unit and the exhaust nozzle 20). The cooler bypass flow therefore allows lower cost and lighter materials to be employed for these components, whereas a conventional reheat system would require high temperature capability and cooling.

Figure 4A:
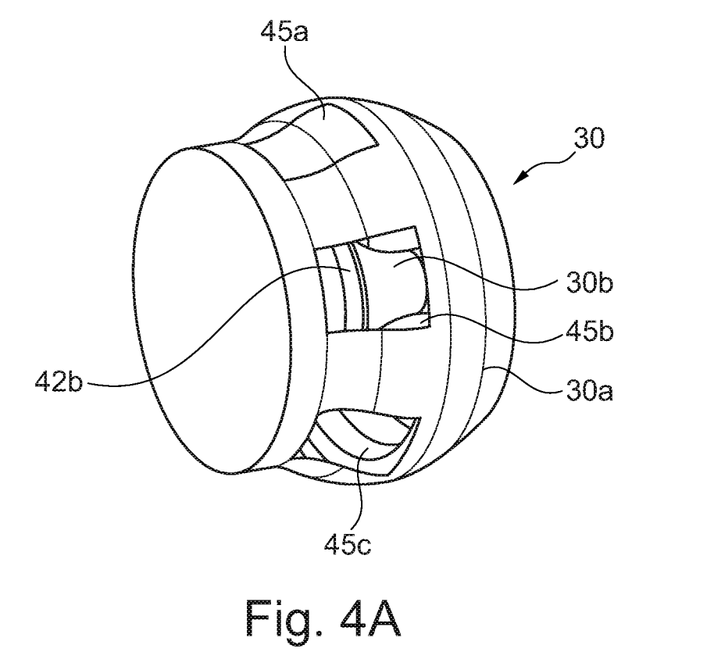
FIGS. 4A and 4B provide respective perspective views of the afterburner system in a non-reheating configuration.
Figure 4B:
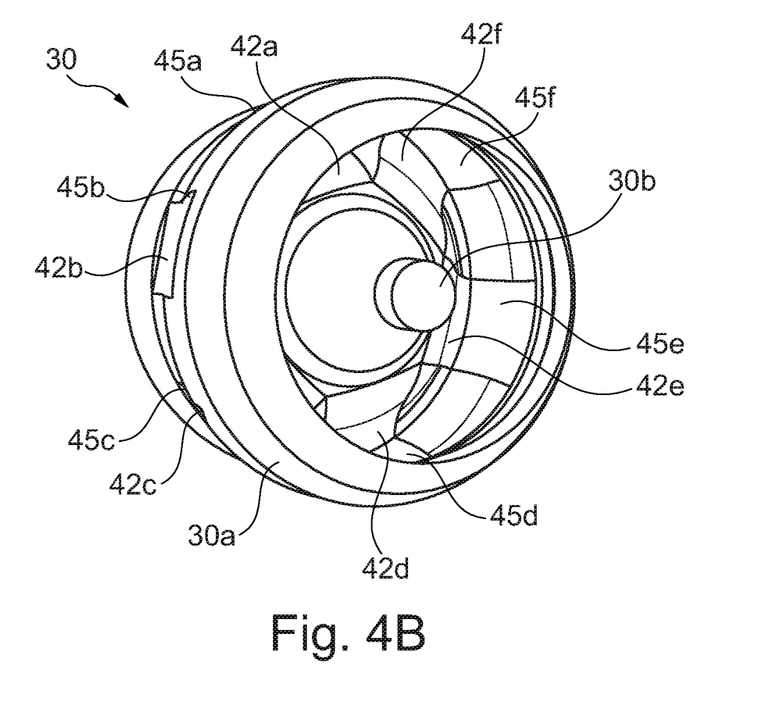

FIGS. 4A and 4B show perspective views of the afterburner system 40 of FIGS. 2 and 3 without the fuel injector and igniter units 43 and in the non-reheating configuration. As such, flap-like doors 42a-42f are open, and so core exhaust may flow through entrances 45a-45f into the annular second core flow duct formed between an outer wall 30a and an inner tubular projection 30b of the core plug 30.

In the examples discussed above, the fuel injectors and igniters 43 are exposed to the diverted portion 27b of the core exhaust flow 201 during normal (non-reheating) operation of the engine. However, in other examples they may be concealed from the second core flow duct during normal operation and hence removed from exposure to the diverted portion 27b, but revealed to the second core flow duct in the reheating configuration. For example, the fuel injectors and igniters may be hidden behind the doors 42 when the doors are open (e.g. recessed in the inner tubular projection 30b of the core plug 30) to be revealed when the doors are closed. In this way, losses in the diverted portion 27b of the core exhaust flow 201 can be reduced.

Although not shown in the examples above, the afterburner system 40 may include one or more flow straighteners located between respective pairs of adjacent doors 42. The flow straighteners may, for example, extend in a direction generally aligned with the axis of the engine to better align the direction of the diverted portion 27b of the core exhaust flow 201 with that axis.

Although also not shown in the examples above, the afterburner system 40 may include a physical flameholder to stabilise the flame. Like the fuel injectors and igniters 43, such a flameholder may be arranged so that it is concealed from the second core flow duct during normal operation, but revealed to the second core flow duct in the reheating configuration.

The afterburner system 40 can be retro-fitted to existing engines where additional thrust boost is required.

Although described above in relation to a supersonic gas turbine engine, the afterburner system 40 can be usefully applied to subsonic engines, e.g. to enhance field performance and dash capability in exceptional circumstances, when noise regulations permit.

Other gas turbine engines to which the present disclosure may be applied may have alternative configurations. By way of example such engines may have a different number of interconnecting shafts (e.g. one or three) and/or a different number of compressors and/or turbines and/or a single stage fan. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A turbofan engine having:
   an engine core comprising a compressor, a combustor, a turbine, and a core shaft connecting the turbine to the compressor, and producing a core exhaust flow;
   a fan upstream of the engine core;
   a bypass duct surrounding the engine core and carrying a bypass air flow produced by the fan;
   an exhaust assembly comprising a first exhaust nozzle defining a downstream end of a first core flow duct which receives the core exhaust flow produced by the engine core; and
   an afterburner system comprising:
      a core plug defining a radially inner surface of the first core flow duct;
      a second core flow duct located in the core plug, and having one or more entrances from the first core flow duct for diversion into the second core flow duct of a portion of the core exhaust flow, and further having an exit therefrom for re-joining the diverted portion of the core exhaust flow to the undiverted portion of the core exhaust flow;
      one or more respective doors for the entrances to the second core flow duct, the doors being open during normal operation of the engine but being closable, during a reheat operation, to at least partially block the entrances to the second core flow duct; and
      one or more fuel injectors and one or more respective igniters operable, during the reheat operation, to respectively inject and ignite fuel within the second core flow duct, thereby providing a reheat flow into the core exhaust flow from the exit of the second core flow duct.

2. The turbofan engine of claim 1 wherein the first exhaust nozzle also defines a downstream end of the bypass duct, and the engine further has an exhaust duct receiving the bypass air flow and the core exhaust flow and exhausting these flows at a second exhaust nozzle.

3. The turbofan engine of claim 2 wherein the first exhaust nozzle is a mixer nozzle which encourages mixing of the bypass air flow and the core exhaust flow downstream thereof.

4. The turbofan engine of claim 1, wherein the afterburner system further comprises a fuel-based hydraulic system for actuating the opening and closing of the doors.

5. The turbofan engine of claim 1, wherein the fuel injectors and igniters are configured to be concealed from the second core flow duct when the doors are open and revealed to the second core flow duct when the doors are closed.

6. The turbofan engine of claim 1, wherein the second core flow duct is an annular duct coaxial with an axis of the engine.

7. The turbofan engine of claim 1, wherein the afterburner system comprises plural doors circumferentially spaced around the core plug.

8. The turbofan engine of claim 7, wherein the afterburner system further comprises flow straighteners located between respective pairs of adjacent doors.

9. The turbofan engine of claim 1, wherein the doors, when closed, reduce the amount of flow diversion from the second core flow duct to form a purge flow in the second core flow duct.

10. An afterburner system, installable downstream of an engine core of a turbofan engine, the system including:
    a core plug defining a radially inner surface of a first core flow duct which receives a core exhaust flow produced by the engine core;
    a second core flow duct located in the core plug, and having one or more entrances from the first core flow duct for diversion into the second core flow duct of a portion of the core exhaust flow, and further having an exit therefrom for re-joining the diverted portion of the core exhaust flow to the undiverted portion of the core exhaust flow;

one or more respective doors for the entrances to the second core flow duct, the doors being open during normal operation of the engine but being closable, during a reheat operation, to at least partially block the entrances to the second core flow duct; and one or more fuel injectors and one or more respective igniters operable, during the reheat operation, to respectively inject and ignite fuel within the second core flow duct, thereby providing a reheat flow into the core exhaust flow from the exit of the second core flow duct.

11. A supersonic aircraft having one or more turbofan engines according to claim 1.

12. A method of providing a temporary thrust boost in a supersonic aircraft having one or more turbofan engines, each of the one or more turbofan engines comprising:
   an engine core comprising a compressor, a combustor, a turbine, and a core shaft connecting the turbine to the compressor, and producing a core exhaust flow;
   a fan upstream of the engine core;
   a bypass duct surrounding the engine core and carrying a bypass air flow produced by the fan;
   an exhaust assembly comprising a first exhaust nozzle defining a downstream end of a first core flow duct which receives the core exhaust flow produced by the engine core; and
   an afterburner system comprising:
      a core plug defining a radially inner surface of the first core flow duct;
      a second core flow duct located in the core plug, and having one or more entrances from the first core flow duct for diversion into the second core flow duct of a portion of the core exhaust flow, and further having an exit therefrom for re-joining the diverted portion of the core exhaust flow to the undiverted portion of the core exhaust flow;
      one or more respective doors for the entrances to the second core flow duct, the doors being open during normal operation of the engine but being closable, during a reheat operation, to at least partially block the entrances to the second core flow duct; and
      one or more fuel injectors and one or more respective igniters operable, during the reheat operation, to respectively inject and ignite fuel within the second core flow duct, thereby providing a reheat flow into the core exhaust flow from the exit of the second core flow duct,
   wherein the method includes the step of:
   closing the doors so as to at least partially block the entrances to the second core flow duct.

13. The method of claim 12, further including the step of:
   injecting and igniting fuel within the second core flow duct, thereby providing a reheated airflow and a temporary thrust boost.

14. The method of claim 13, further including the steps, performed after providing the temporary thrust boost, of:
   ending the injection and ignition of fuel within the second core flow duct; and
   re-opening the doors.

15. The method of claim 13, wherein the temporary thrust boost is performed as part of a trans-sonic thrust flight operation of the aircraft.

* * * * *